United States Patent
Lee

(10) Patent No.: US 9,954,921 B2
(45) Date of Patent: Apr. 24, 2018

(54) RATE-ADAPTIVE DATA STREAM MANAGEMENT SYSTEM AND METHOD FOR CONTROLLING THE SAME

(71) Applicant: Electronics and Telecommunications Research Institute, Daejeon (KR)

(72) Inventor: Yong Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 609 days.

(21) Appl. No.: 14/590,211

(22) Filed: Jan. 6, 2015

(65) Prior Publication Data

US 2015/0207840 A1 Jul. 23, 2015

(30) Foreign Application Priority Data

Jan. 21, 2014 (KR) .......................... 10-2014-0007099

(51) Int. Cl.
*H04L 29/06* (2006.01)

(52) U.S. Cl.
CPC ............ *H04L 65/602* (2013.01); *H04L 65/80* (2013.01)

(58) Field of Classification Search
CPC ........ H04L 29/06; H04L 65/602; H04L 65/80
See application file for complete search history.

(56) References Cited

U.S. PATENT DOCUMENTS

| 4,862,461 | A | * | 8/1989 | Blaner | H04L 12/56 714/749 |
|---|---|---|---|---|---|
| 8,014,360 | B2 | | 9/2011 | Kim et al. | |
| 8,406,309 | B2 | | 3/2013 | Lee et al. | |
| 9,298,788 | B1 | * | 3/2016 | Kekre | G06F 17/30569 |
| 2003/0074389 | A1 | * | 4/2003 | Kang | H04L 29/06 718/106 |
| 2006/0271982 | A1 | * | 11/2006 | Gallou | H04L 29/06027 725/100 |
| 2008/0117815 | A1 | | 5/2008 | Kim et al. | |
| 2008/0127255 | A1 | * | 5/2008 | Ress | H04N 7/17318 725/38 |
| 2009/0055508 | A1 | | 2/2009 | Amador et al. | |
| 2011/0243000 | A1 | * | 10/2011 | Nagaraja | H04L 1/0026 370/252 |
| 2011/0296049 | A1 | * | 12/2011 | Wang | H04N 21/437 709/231 |
| 2012/0063301 | A1 | * | 3/2012 | Schel | H04W 36/26 370/225 |

(Continued)

FOREIGN PATENT DOCUMENTS

| KR | 10-2002-0096323 A | 12/2002 |
|---|---|---|
| KR | 10-2008-0044963 A | 5/2008 |

(Continued)

*Primary Examiner* — Jerry B Dennison
(74) *Attorney, Agent, or Firm* — Rabin & Berdo, P.C.

(57) ABSTRACT

Disclosed is a rate-adaptive data stream management system (DSMS) which is a precedence task, which has a descendent task, and a plurality of data channels and a plurality of feedback channels, the system including: a feedback analyzer which analyzes a control command transmitted from the descendent task; and a data channel selector which controls transmission of a data stream through the data channel with the descendent task based on the analysis result.

10 Claims, 9 Drawing Sheets

(56) References Cited

U.S. PATENT DOCUMENTS

| | | | | |
|---|---|---|---|---|
| 2012/0207236 A1* | 8/2012 | Oh | .................. | H04B 7/0854 375/267 |
| 2012/0281536 A1* | 11/2012 | Gell | .................. | H04W 28/06 370/235 |
| 2013/0142035 A1* | 6/2013 | Sunderrajan | .......... | H04L 47/728 370/225 |
| 2014/0156707 A1* | 6/2014 | Sax | .................. | G06F 17/30958 707/798 |
| 2014/0304545 A1* | 10/2014 | Chen | .................. | G06F 9/3863 714/4.3 |
| 2014/0304549 A1* | 10/2014 | Hsu | .................. | G06F 11/0793 714/15 |
| 2015/0016366 A1* | 1/2015 | Ranta-Aho | ......... | H04W 74/002 370/329 |
| 2015/0089557 A1* | 3/2015 | Busse | .............. | H04N 21/23439 725/95 |
| 2016/0087759 A1* | 3/2016 | Hsu | .................. | H04L 1/1809 714/749 |
| 2016/0269247 A1* | 9/2016 | Chakradhar | ............ | H04L 67/12 |

FOREIGN PATENT DOCUMENTS

| | | |
|---|---|---|
| KR | 10-2012-0092520 A | 8/2012 |
| KR | 10-2012-0122136 A | 11/2012 |

\* cited by examiner

RATE-ADAPTIVE DATA STREAM MANAGEMENT SYSTEM AND METHOD FOR CONTROLLING THE SAME

CROSS-REFERENCE TO RELATED APPLICATIONS

This application claims priority to and the benefit of Korean Patent Application No. 10-2014-0007099 filed in the Korean Intellectual Property Office on Jan. 21, 2014, the entire contents of which are incorporated herein by reference.

TECHNICAL FIELD

The present invention relates to a rate-adaptive data stream management system and a method for controlling the same, and more particularly, to a rate-adaptive data stream management system and a method for controlling the same that analyze feedback information provided from a descendent task in a precedence task in a plurality of paths including a plurality of data channels and a plurality of feedback channels and distributively parallelize channels through a plurality of data streams are transmitted based on an analysis result in a data channel selecting unit provided in the precedence task.

BACKGROUND ART

A data stream management system (DSMS) is a system that manages real-time transmission and processing of data streams.

The data stream management system is different from a database management system as described below. That is, first, streams are infinite. Second, a reaching order of data cannot be assumed. Third, a scale and a time limit make data stream elements difficult to be stored and processed after being reached. Therefore, processing data at a time is a general mechanism that handles the stream. In the data stream management system, various communication methods are required for efficiently processing the data.

A communication method of the data stream management system includes a pattern in which the data is transmitted and received through a channel (or one socket) made by a network protocol (including, for example, a TCP, a UDP, and the like) through a single path. The single channel has a lower throughput than a plurality of channels and the corresponding channel brings about a load of a made server. In response thereto, there is a split/collect technology that distributively transmits data to a plurality of channels and collects the distributively transmitted data and analyze the data. A representative example of the spilt/collect technology is a MapReduce technology of Hadoop used in distributively parallel processing. The MapReduce technology of Hadoop transmits data to a plurality of distributed servers (split), processes the data in a server that receives the corresponding data, and collects a result of processing the data to acquire the same result as in the single channel.

In an open source based data stream management system (including, for example, Yahoo S4, Strom, and the like), a plurality of tasks is placed in a plurality of server nodes, and as a result, the plurality of tasks transmits and receives channel communication with each other. Therefore, extensibility is assured in a pattern (alternatively, granularity to assure the extensibility is all of the tasks) in which all of the tasks are statically relocated through a specific parameter (for example, a parallelism coefficient of Storm). However, even in a plurality of data stream management systems that performs the channel communication, communication amounts of channels are transmitted to a master node and the tasks are relocated by using corresponding information. As a result, in the open source based data stream management system, an overhead is present while all channels that belong to the tasks are relocated again.

As described above, in a Hadoop system or the open source based data stream management system, relocation needs to be performed for each task, and as a result, system operating efficiency deteriorates.

SUMMARY OF THE INVENTION

The present invention has been made in an effort to provide a rate-adaptive data stream management system and a method for controlling the same that form a plurality of path channels in order to process large-capacity data and apply a rate to a communication amount.

The present invention has also been made in an effort to provide a rate-adaptive data stream management system and a method for controlling the same that do not just perform distributive parallelization to a plurality of path communication channels, but adaptively control a network communication flow in a plurality of channels based on feedback information corresponding to a processing rate for each channel depending on communication amounts of a plurality of path communication channels.

An exemplary embodiment of the preset invention provides a rate-adaptive data stream management system (DSMS) which is a precedence task, which has a descendent task, and a plurality of data channels and a plurality of feedback channels, the system including: a feedback analyzer which analyzes a control command transmitted from the descendent task; and a data channel selector which controls transmission of a data stream through the data channel with the descendent task based on the analysis result.

The feedback analyzer may verify at least one command of an ace command, a victim command, and a hidden command included in the control command.

The data channel selector may transmit the data stream to the descendent task through the data channel when the ace command is included in the analysis result.

The data channel selector may release the data channel when the victim command is included in the analysis result.

The data channel selector may set a new data channel and transmit the data stream to the descendent task through the set new data channel when the hidden command is included in the analysis result.

Another exemplary embodiment of the present invention provides a rate-adaptive data stream management system (DSMS) which is a descendent task, which has a precedence task, and a plurality of data channels and a plurality of feedback channels, the system including: a data receiver which receives a data stream transmitted from the precedence task; a statistical collector which collects statistical information on the data stream received through the data receiver; and a flow controller which generates a control command including information regarding whether to keep the data channel connected with the precedence task based on the statistical information on the data stream, and transmits the generated control command to the precedence task.

The statistical information on the data stream may include at least one of a receiving amount and a receiving rate of data for the data stream.

The flow controller may generate the control command every predetermined cycle or when the existing connection is terminated.

The control command may include any one command of an ace command which is information for keeping a data channel connected between the precedence task and the descendent task, a victim command which is information for releasing the data channel, and a hidden command which is information for setting a new data channel.

Yet another exemplary embodiment of the present invention provides a method for controlling a rate-adaptive data stream management system (DSMS) which is a precedence task, which has a descendent task, and a plurality of data channels and a plurality of feedback channels, the method including: analyzing, by the rate-adaptive DSMS, a control command transmitted from the descendent task; and controlling, by the rate-adaptive DSMS, transmission of a data stream through the data channel with the descendent task based on the analysis result.

The controlling of transmission of the data stream through the data channel may include: aligning a connection of data to be transmitted based on the received analysis result; verifying a predetermined number of times or not during a predetermined cycle; newly setting a data channel and transmitting a data stream to the descendent task through the set new data channel, in the case of the predetermined number of times during the predetermined cycle as the verification result; and transmitting the data stream to the descendent task through the data channel, which is kept at present, based on current connection information in the case of not the predetermined number of times during the predetermined cycle as the verification result.

Still another exemplary embodiment of the present invention provides a method for controlling a rate-adaptive data stream management system (DSMS) which is a descendent task, which has a precedence task, and a plurality of data channels and a plurality of feedback channels, the method including: receiving, by the rate-adaptive DSMS, a data stream transmitted from the precedence task; collecting, by the rate-adaptive DSMS, statistical information on the received data stream; generating, by the rate-adaptive DSMS, a control command including information regarding whether to keep the data channel connected with the precedence task based on the statistical information on the data stream; and transmitting, by the rate-adaptive DSMS, the generated control command to the precedence task.

In the rate-adaptive data stream management system and the method for controlling the same according to the exemplary embodiments of the present invention, a plurality of path channels is formed in order to process the large-capacity data, and the rate is applied to the communication amount, and as a result, a reduction in the throughput due to a delay of interchannel communication in a plurality of servers, which occurs in the distributive parallelizing technology, is prevented, and a processing rate is updated based on only communication amounts of channels that belong to the task, as compared with the Hadoop system or the open source-based data stream management system which needs to be achieved throughout the task (for example, relocation of the tasks are generally required), and as a result, the granularities are different from each other and data may be processed by the minute unit.

In the rate-adaptive data stream management system and the method for controlling the same according to the exemplary embodiments of the present invention, data is not distributively parallelized to simple communication channels of a plurality of paths, the network communication flow is adaptively controlled to the plurality of channels based on the feedback information corresponding to the processing rate for each channel depending on the communication amounts of the plurality of path communication channels to provide an efficient data processing rate, as compared with the plurality of simple path communication channels in which data is distributively located by a round robin method or randomly. That is, a descendent task that most faithfully receives the data transmitted from the precedence task and a trailing disk which does not so are separated based on the feedback information, more data are transmitted to the descendent task that most faithfully receives the data and the transmission rate of the data to the corresponding descendent task can be increased until the transmitted data is appropriately received and the amount of data to be transmitted to the descendent task that does not so is decreased, thereby providing an efficient data processing rate by controlling the transmission rate on the whole.

BRIEF DESCRIPTION OF THE DRAWINGS

FIG. 11 is progressed according to the exemplary embodiment of the present invention.

Figure 1:
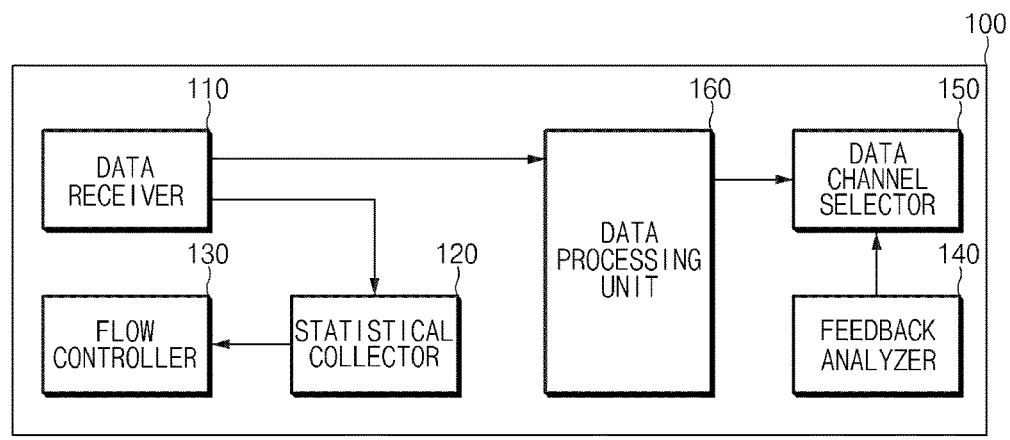
FIG. 1 is a configuration diagram of a rate-adaptive data stream management system (DSMS) according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is noted that technical terms used in the specification are used to just describe a specific exemplary embodiment and do not intend to limit the present invention. Further, unless otherwise specified, the technical terms used in the present invention should be interpreted as meanings generally appreciated by those with ordinary skill in the art to which the present invention pertains, and should not be interpreted as excessively comprehensive meanings or excessively restricted meanings. Further, when the technical term used in the present invention is a wrong technical term that does not accurately express the spirit of the present invention, the technical term should be substituted by and appreciated as a technical term which can correctly appreciated by those skilled in the art. In addition, a general term used in the present invention should be interpreted as defined in a dictionary or according to the context and should not be interpreted as an excessively reduced meaning.

If a singular expression used in the present invention is not apparently different on a context, the singular expression includes a plural expression. Further, in the present invention, it should not interpreted that a term such as "comprising" or "including" particularly includes all of various components or various steps disclosed in the invention and some component or some steps among them may not be included or additional components or steps may be further included.

Terms including ordinal numbers, such as 'first', 'second', etc., which are used in the present invention, can be used to describe various components, but the components should not be limited by the terms. The above terms are used only for distinguishing one component from another component. For example, a first component may be named a second component and similarly, the second component may also be named the first component, while not departing from the scope of the present invention.

Hereinafter, exemplary embodiments of the present invention will be described in detail with reference to the accompanying drawings, and like or similar reference numerals refer to like elements regardless of reference numerals and a duplicated description thereof will be omitted.

In describing the present invention, when it is determined that the detailed description of the publicly known art related to the present invention may obscure the gist of the present invention, the detailed description thereof will be omitted. Further, it is noted that the accompanying drawings are used just for easily appreciating the spirit of the present invention and it should not be analyzed that the spirit of the present invention is limited by the accompanying drawings.

FIG. 1 is a configuration diagram of a rate-adaptive data stream management system (DSMS) 100 according to an exemplary embodiment of the present invention.

As illustrated in FIG. 1, the rate-adaptive data stream management system 100 includes a data receiver 110, a statistical collector 120, a flow controller 130, a feedback analyzer 140, a data channel selector 150, and a data processing unit 160. All constituent elements of the rate-adaptive data stream management system 100 illustrated in FIG. 1 are not required, and the rate-adaptive data stream management system 100 may be implemented by more or fewer constituent elements than the constituent elements illustrated in FIG. 1.

Figure 2:
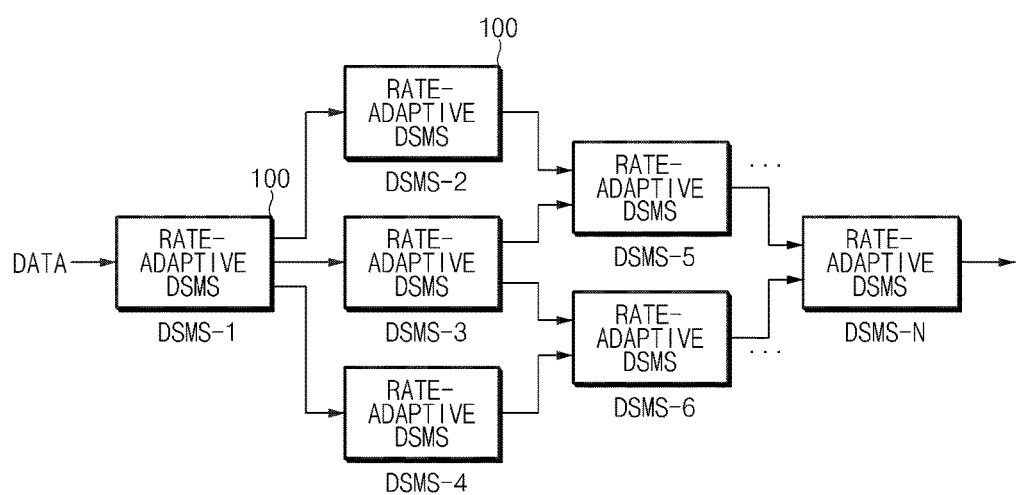
FIG. 2 is a diagram illustrating a system configured by a plurality of rate-adaptive DSMSs according to an exemplary embodiment of the present invention.

As illustrated in FIG. 2, the rate-adaptive data stream management system 100 is constituted in plural and the plurality of rate-adaptive data stream management systems 100 is connected to each other through a plurality of data channels and a plurality of feedback channels. In this case, in the plurality of rate-adaptive data stream management systems 100, a rate-adaptive data stream management system 100, which transmits data streams, is referred to as a precedence task, and a rate-adaptive data stream management system 100, which receives the data streams transmitted from the precedence task and transmits feedback information on the received data streams to the precedence task, is referred to as a descendent task. The precedence task and the descendent task may be changed depending on a connection between the rate-adaptive DSMSs 100. That is, in the case of a first rate-adaptive DSMS and a second rate-adaptive DSMS illustrated in FIG. 2, the first rate-adaptive DSMS may become the precedence task and the second rate-adaptive DSMS may become the descendent task, and in the case of the second rate-adaptive DSMS and a fifth rate-adaptive DSMS, the second rate-adaptive DSMS may become the precedence task and the fifth rate-adaptive DSMS may become the descendent task.

As described above, each of the plurality of rate-adaptive DSMSs 100 applied to an entire system according to the exemplary embodiment of the present invention serves as the precedence task or the descendent task according to a connection relationship with another rate-adaptive DSMS 100.

As illustrated in FIG. 2, one or more rate-adaptive DSMSs (for example, the first rate-adaptive DSMS) among the plurality of rate-adaptive DSMSs 100 receive the data streams transmitted from an external terminal (for example, a vehicle), one or more rate-adaptive DSMSs (for example, an N-th rate-adaptive DSMS) among the plurality of rate-adaptive DSMSs 100 transmit a final result to another external terminal, and the remaining rate-adaptive DSMSs, which are positioned between the first rate-adaptive DSMSs and the N-th rate-adaptive DSMS, serve to distributively parallelize respective data.

In the precedence task (for example, the first rate-adaptive DSMS) and the descendent task (for example, the second rate-adaptive DSMS) in which a plurality of paths including the plurality of data channels and the plurality of feedback channels, the descendent task receives the data stream transmitted from the precedence task through the data channel, generates a control command based on statistical information on the received data stream, and transmits the generated control command to the precedence task through the feedback channel. Thereafter, the precedence task controls the data stream transmitted to the descendent task through the data channel based on the control command transmitted from the descendent task through the feedback channel.

Figure 3:
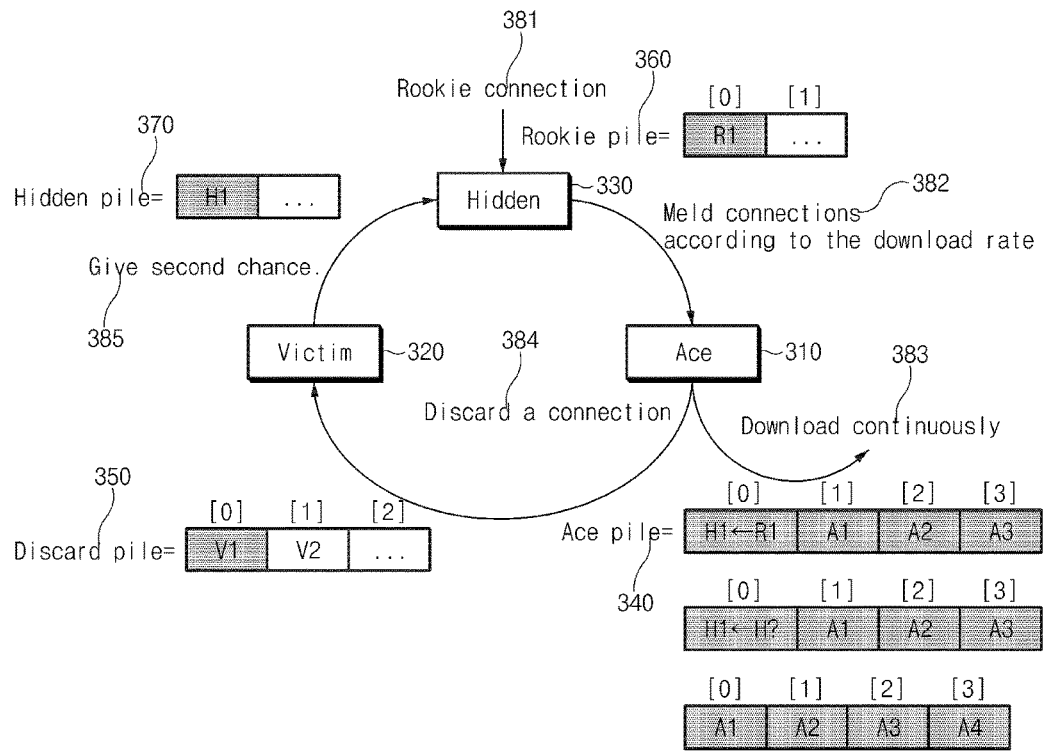
FIG. 3 is a state transition diagram of the rate-adaptive data stream management system (DSMS) according to the exemplary embodiment of the present invention.

As illustrated in FIG. 3, the rate-adaptive DSMSs 100 having communication channels of a plurality of paths have three states. Herein, three states include ace 310, victim 320, and hidden 330. Further, in order to manage three states, respectively, three lists (including an ace pile 340, a discard pile 350, and a rookie pile 360, and the like) are present. Further, a hidden pile 370 for a connection newly reused in the victim 320 may be further included in the lists.

As illustrated in FIG. 3, the newly accessed connection may become a rookie connection 381, be stored (alternatively, input/received) in the rookie pile 360, and be transferred (alternatively, transmitted) (382) to the ace pile 340 at a predetermined specific point of time. A state transition between piles will be described in the description for the flow controller 130.

The ace 310 may continuously download data through the corresponding connection (alternatively, the corresponding data channel) (383) or be selected as the victim 320 to be contained in and transferred to the discard pile 350 (384) at a specific point of time.

The victim 320 is selected as the hidden 330 at another specific point of time to acquire an opportunity capable of participating in the channel communication together with the ace 310 (385).

The rookie pile 360 is selected as the victim 320, and as a result, even a pushed connection may enter the rookie pile 360 again. A new connection and a connection to newly acquire the opportunity in the existing victim 320 coexist in the rookie pile 360. In this case, the new connection has no existing participation record, but the connection to newly acquire the opportunity in the victim 320 just keeps the existing connection information.

The data receiver (alternatively, a data communication unit) 110 communication-connects with an internal constituent element or at least one external terminal through a wired/wireless communication network. In this case, the external terminal may include a vehicle, another rate-adaptive DSMS 100 (alternatively, the precedence task/descendent task), and the like. Herein, examples of a wireless Internet technology may include wireless LAN (WLAN), Wi-Fi, wireless broadband (Wibro), world interoperability for microwave access (Wimax), high speed downlink packet access (HSDPA), IEEE 802.16, long term evolution (LTE), wireless mobile broadband service (WMBS), and the like. Examples of a near-field communication technology may include Bluetooth, radio frequency identification (RFID), infrared data association (IrDA), ultra wideband (UWB), ZigBee, near field communication (NFC), ultra sound communication (USC), visible light communication (VLC), and the like. Examples of a wired communication technology may include power line communication (PLC), USB communication, Ethernet, serial communication, an optical/coaxial cable, and the like.

The data receiver 110 receives the data stream transmitted from the external terminal or another rate-adaptive DSMS 100 (alternatively, the precedence task). Herein, when receiving the data stream transmitted from another rate-adaptive DSMS 100, the data receiver 110 receives the data stream transmitted from another rate-adaptive DSMS 100 through a predetermined (alternatively, preconnected) data channel with the another rate-adaptive DSMS 100.

Figure 4:
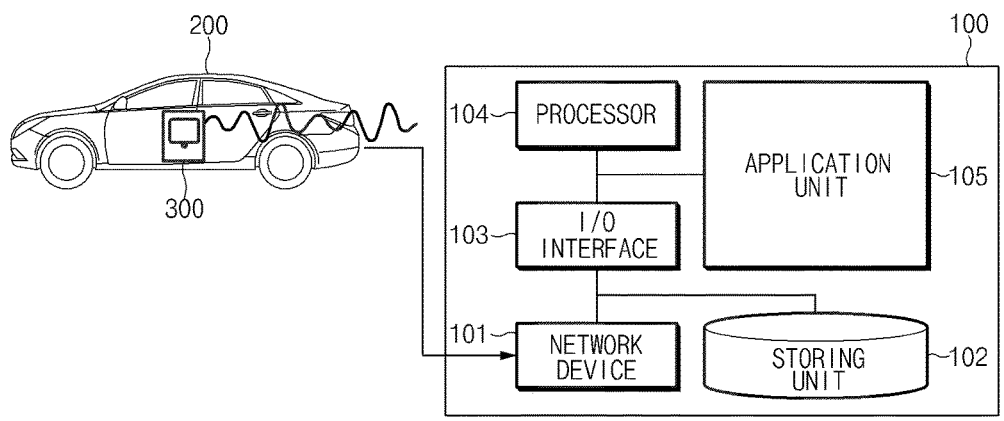
FIG. 4 is a diagram illustrating communication between an external terminal and the rate-adaptive DSMS provided in a vehicle according to the exemplary embodiment of the present invention.

That is, as illustrated in FIG. 4, the data receiver 110 receives data (alternatively, bit data) transmitted from an external terminal (or an external device) 300 provided in a vehicle 200. In this case, the external terminal 300 may collect vehicle operating situation information through a black box (not illustrated), driving information and traffic situation information through a navigation (not illustrated), a heart rate and blood pressure information of a driver though a wearable device (alternatively, a smart watch) (not illustrated), and the like and transmit the collected data to the data receiver 110. As described above, the data transmitted from the external terminal 300 may be used to provide an alarm (including, for example, driving stop, danger warning, and the like) to the driver by judging a state of the driver in the vehicle 200 by analyzing log data (including for example, body information, vehicle information, and the like) through the rate-adaptive DSMS 100. The data transmitted from the external terminal 300 may be used to provide a driver-related service (including, for example, statistical information, traffic information for each section, driver's driving pattern information, and the like), and the like through the rate-adaptive DSMS 100.

The data receiver 110 transfers (alternatively, transmits) the received data stream to the statistical collector 120 and the data processing unit 160.

The data receiver 110, the statistical collector 120, the flow controller 130, the feedback analyzer 140, the data channel selector 150, and the data processing unit 160 included in the rate-adaptive DSMS 100 may also be included in an application unit 105 illustrated in FIG. 4.

Herein, a network device 101 illustrated in FIG. 4 receives data (alternatively, big data) transmitted from the external terminal (or external device) 300 provided in the vehicle 200.

The network device 101 may perform a function of the data receiver 110.

A storing unit (alternatively, a storage) 102 stores data and programs required for the rate-adaptive DSMS 100 to operate. The storing unit 102 stores various user interfaces (UIs), a graphic user interface (GUI), and the like. Examples of the storing unit 102 may include at least one storage medium of a flash memory type, a hard disk type, a multimedia card micro type, a card type memory (for example, an SD or XD memory), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). The rate-adaptive DSMS 100 may operate a web storage that performs a storage function of the storing unit 102 on the Internet or operate in association with the web storage. The storing unit 102 stores the data stream received through the network device 101.

An I/O interface 103 serves to interface with all external devices (alternatively, external terminals) connected to the rate-adaptive DSMS 100. The I/O interface 103 may include a wired/wireless headset port, an external charger port, a wired/wireless data port, a memory card port, a port for connecting a device with an identification module, an audio input/output (I/O) port, a video input/output (I/O) port, an earphone port, and the like. Herein, an identification module as a chip storing various pieces of information for authenticating a use authority of the rate-adaptive DSMS 100 may include a user identify module (UIM), a subscriber identity module (SIM), a universal subscriber identity module (USIM), and the like. The device with the identification module may be fabricated in a smart card type. Accordingly, the identification module may be connected with the rate-adaptive DSMS 100 through the port. The I/O interface 103 receives data or power from an external apparatus to transfer the received data or power to each constituent element in the rate-adaptive DSMS 100 or allows data in the rate-adaptive DSMS 100 to be transmitted the external apparatus.

The I/O interface 103 may become a passage through which power from a cradle is supplied to the rate-adaptive DSMS 100 when the rate-adaptive DSMS 100 is connected with an external cradle or a passage through which various command signals input from the cradle by the user are transferred to the rate-adaptive DSMS 100. Various command signals or power input from the cradle may operate as a signal for recognizing that the rate-adaptive DSMS 100 is accurately mounted on the cradle. The I/O interface 103 transfers the data stream received through the network device 101 to a processor 104 or the application unit 105.

The processor (alternatively, controller) 104 controls an overall operation of the rate-adaptive DSMS 100. The processor 103 performs a predetermined processing function for the data stream transferred from the I/O interface 103.

The application unit 105 manages (alternatively, controls) one or more applications included in the rate-adaptive DSMS 100. The application unit 105 may include the data receiver 110, the statistical collector 120, the flow controller 130, the feedback analyzer 140, the data channel selector 150, and the data processing unit 160 according to the exemplary embodiment of the present invention.

The statistical collector 120 collects (or verifies) the statistical information on the data stream received through the data receiver 110. Herein, the statistical information on the data stream includes information for understanding a transmission pattern of the precedence task including a data receiving amount (or throughput) for the received data stream, a receiving ratio for the received data stream, and the like. The statistical collector 120 transfers the collected statistical information to the flow controller 130.

The flow controller 130 receives the statistical information on the data stream transferred from the statistical collector 120. The flow controller 130 generates a control command (alternatively, a control command/control signal including state information of the corresponding data channel) including information regarding whether to keep the data channel formed between the corresponding rate-adaptive DSMS 100 (alternatively, the descendent task) and another rate-adaptive DSMS 100 (alternatively, the precedence task) based on the statistical information on the data stream. In this case, the flow controller 130 may generate the corresponding control command every predetermined cycle or when the existing connection (alternatively, the connection for the existing data channel) is terminated. Herein, the control command includes information (for example, an ace command) for keeping the corresponding data channel, information (for example, a victim command) for releasing (alternatively, excluding) the corresponding data channel, information (for example, a hidden command) for setting a new data channel, and the like.

The flow controller 130 transmits the generated control command in the precedence task connected to the corresponding rate-adaptive DSMS 100 through the feedback channel formed between the corresponding rate-adaptive DSMS 100, which is the descendent task, and the precedence task. An operating principle of the flow controller 130 is illustrated in FIG. 5.

Figure 5:
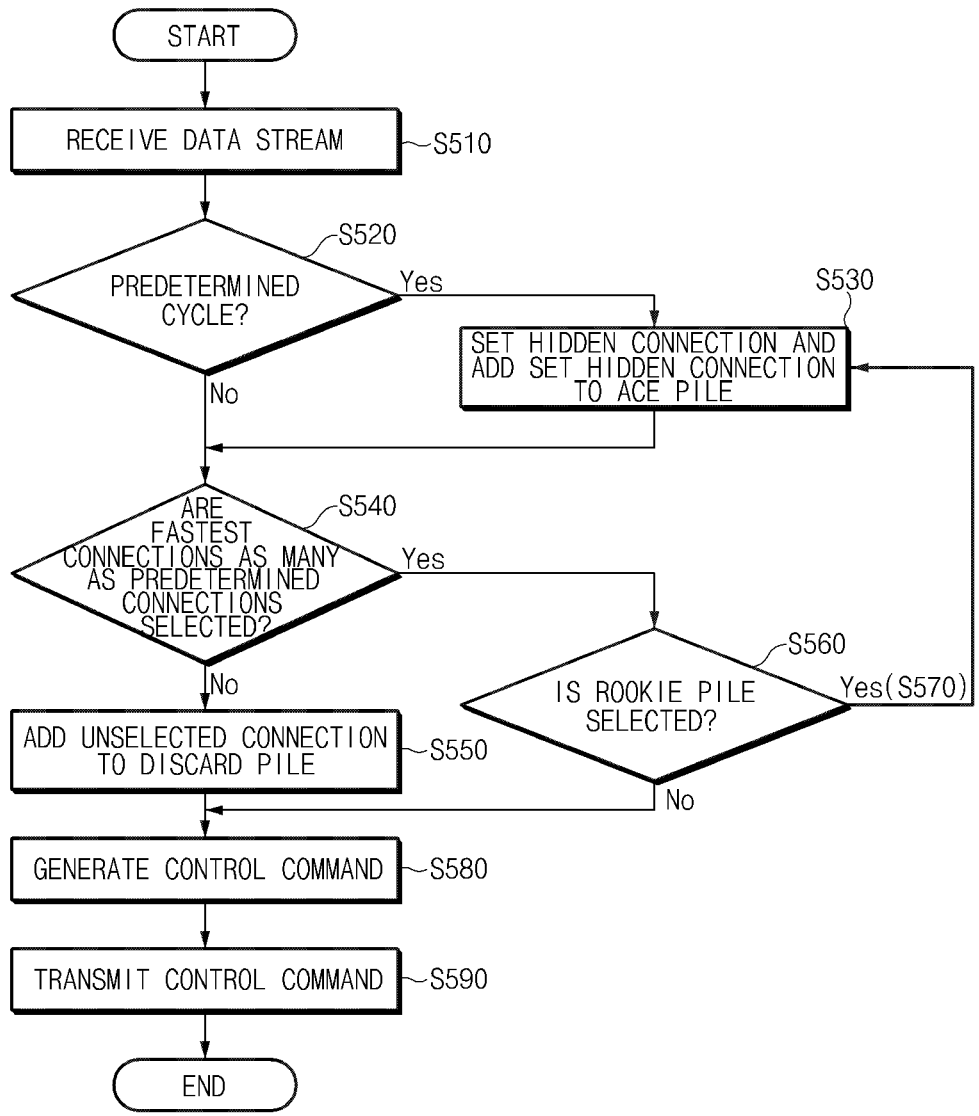
FIG. 5 is a flowchart illustrating a control method in a flow controller according to an exemplary embodiment of the present invention.

That is, as illustrated in FIG. 5, the flow controller 130 reads (alternatively, receives) the statistical information on the data stream collected by the statistical collector 120 every predetermined cycle (for example, 10 seconds) or when the existing connection (alternatively, the connection for the existing data channel) is terminated (S510).

Thereafter, the flow controller 130 verifies a predetermined cycle (for example, 3 times) (S520). As a result of the verification, in the case of the predetermined cycle, the flow controller 130 newly sets a hidden connection in the existing rookie pile 360. The flow controller 130 adds (alternatively, stores) the newly set hidden connection to (in) the ace pile 340 (S530).

As the result of the verification, in the case of not the predetermined cycle, the flow controller 130 selects fastest connections as many as predetermined connections (for example, three) among a plurality of connections (for example, four). The newly set hidden connection is added to the ace pile 340 and thereafter, the flow controller 130 may select fastest connections as many as the predetermined connections among the plurality of connections (S540).

Thereafter, when the fastest connections as many as the predetermined connections among the plurality of connections are not normally selected, the flow controller 130 verifies an unselected (alternatively, excluded) connection among the plurality of connections as the victim 320 and adds the corresponding unselected connection to the discard pile 350 (S550).

When the fastest connections as many as the predetermined connections among the plurality of connections are normally selected, the flow controller 130 judges whether at least one of the selected fastest connections is selected in the rookie pile 360 (S560). As a result of the judgment, when at least one connection of the selected fastest connections is selected in the rookie pile 360, the flow controller 130 newly sets the hidden connection in the existing rookie pile 360 and performs the step (alternatively, step S530) of adding the newly set hidden connection to the ace pile 340 again (S570).

As the result of the judgment, when at least one connection of the selected fastest connections is not selected in the rookie pile 360, the flow controller 130 generates the control command by recording the fastest connections as the previously selected predetermined connections according to respective roles (including, for example, the ace, the victim, the hidden, and the like). That is, when at least one connection of the selected fastest connections is not selected in the rookie pile 360, the flow controller 130 generates a control command including any one command of the ace command, the victim command, and the hidden command for the fastest connections as many as the selected predetermined connections (S580).

Thereafter, the flow controller 130 transmits the generated control command to the precedence task connected to the corresponding rate-adaptive DSMS 100 through the feedback channel. The flow controller 130 repeatedly performs the above steps starting from the first step (for example, step S510) every predetermined cycle (for example, 10 seconds) (S590).

In the exemplary embodiment of the present invention, the predetermined cycle (alternatively, a predetermined task execution time) of 10 seconds, four connections, and a cycle of three times are described, but the present invention is not limited thereto and the predetermined cycle, connections, cycles, and the like may be set according to a design by a designer.

The feedback analyzer 140 receives the control command (alternatively, the control signal) transmitted from the flow controller 130 included in the descendent task. In this case, the task including the feedback analyzer 140 may receive the control command transmitted from the flow controller 130 included in the descendent task through the network device 101 and the I/O interface 103 in the corresponding task. The control command received through the network device 101 and the I/O interface 103 is transferred to the feedback analyzer 140.

The feedback analyzer 140 analyzes the received control command. That is, the feedback analyzer 140 analyzes the control command transferred from the descendent task to verify information (for example, the ace command) for keeping a data channel between the rate-adaptive DSMS 100 which is the precedence task and the descendent task, which is included in the corresponding control command, information (for example, the victim command) for releasing the corresponding data channel, information (for example, the hidden command) for setting a new data channel, and the like. The feedback analyzer 140 transmits an analysis result (alternatively, a verification result) to the data channel selector 150.

Figure 6:
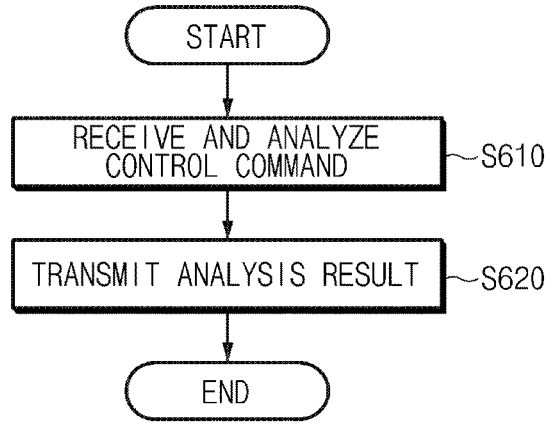
FIG. 6 is a flowchart illustrating a control method in a feedback analyzer according to an exemplary embodiment of the present invention.

An operating principle of the feedback analyzer 140 is illustrated in FIG. 6. That is, as illustrated in FIG. 6, the feedback analyzer 140 receives the control command transmitted from the flow controller 130 included in the descendent task. The feedback analyzer 140 analyzes (alternatively, verifies) which command of the ace command, the victim command, and the hidden command the received control command corresponds to (S610).

Thereafter, the feedback analyzer 140 transmits an analysis result (alternatively, a verification result) to the data channel selector 150. Herein, the ace command represents that a throughput through the current data channel keeps a higher level than a predetermined throughput, and thus a connection through the corresponding data channel is good and a current data channel needs to be continuously kept. The victim command represents that the throughput through the current data channel keeps a lower level than the predetermined throughput, and thus the connection through the corresponding data channel is denied afterwards and another new connection (alternatively, a new data channel) needs to be set (alternatively, found) as fast as possible. The hidden command represents that a new connection is aimed every predetermined cycle and data needs to be received through the new connection (S620).

The data channel selector 150 receives the analysis result (alternatively, verification result) transmitted from the feedback analyzer 140. The data channel selector 150 controls transmission of the data stream through the data channel corresponding to the corresponding analysis result based on the analysis result (alternatively, verification result).

Figure 7:
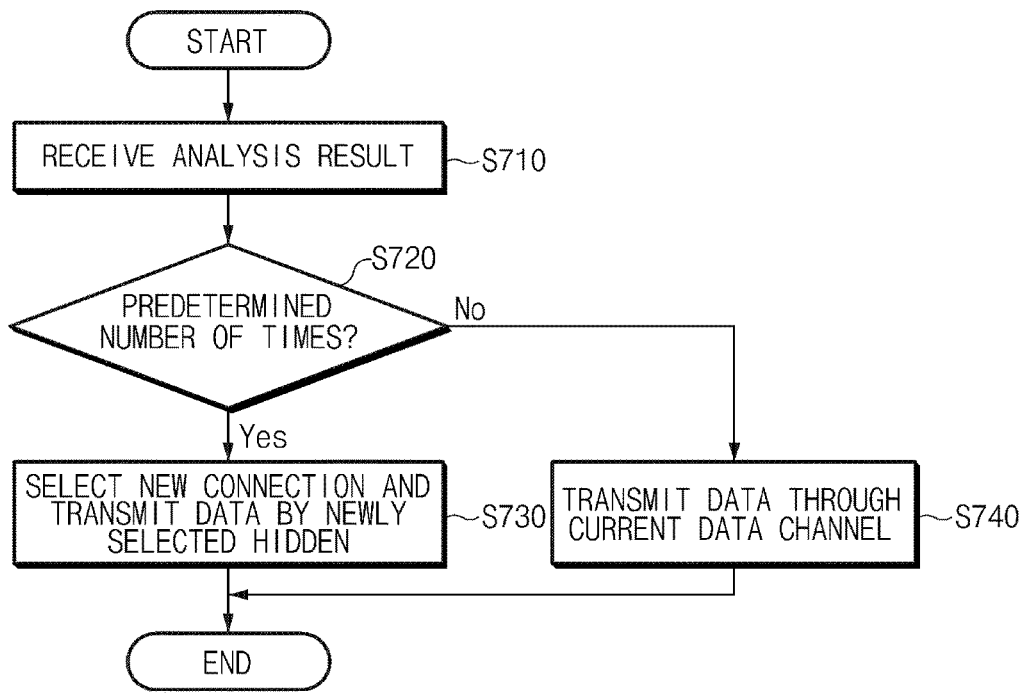
FIG. 7 is a flowchart illustrating a control method in a data channel selector according to an exemplary embodiment of the present invention.

An operating principle of the data channel selector 150 is illustrated in FIG. 7. That is, as illustrated in FIG. 7, the data channel selector 150 receives the analysis result (alternatively, verification result) transmitted from the feedback analyzer 140.

The data channel selector 150 aligns (alternatively, reestablishes) the connection (alternatively, the data channel) of data (alternatively, a data stream) to be transmitted based on the received analysis result (alternatively, verification result). That is, the data channel selector 150 aligns a connection based on an upload rate among the plurality of connections. In this case, a connection having a higher upload rate than a predetermined reference value is referred to as highest upload (HU) and a connection having a lower upload rate than the predetermined reference value is referred to as middle upload (MU) (S710).

Thereafter, the data channel selector 150 sets (alternatively, aims) the connection of the data according to the aligned connection. That is, the data channel selector 150 verifies a predetermined number of times (for example, second/two times) or not during in the predetermined cycle (for example, three times).

Through such a process, the data channel selector 150 may find a connection of a descendent task of which a better upload rate is possible with respect to the new connection. The ace 310 selected through such a process is excluded (alternatively, discarded) again to be selected as the victim 320 when the upload rate is lower than a predetermined reference value (S720).

As a result of the verification, in the case of a predetermined number of times in the predetermined cycle, the data channel selector 150 newly selects (alternatively, sets) the hidden 330 and transmits the data (alternatively, the data stream) to the descendent task through a connection (alternatively, a newly connected data channel) newly connected by the selected hidden 330 (S730).

As the result of the verification, in the case of not the predetermined number of times in the predetermined cycle, the data channel selector 150 transmits the data to the descendent task through the data channel, which is kept at present, based on current connection information (S740).

Figure 8:
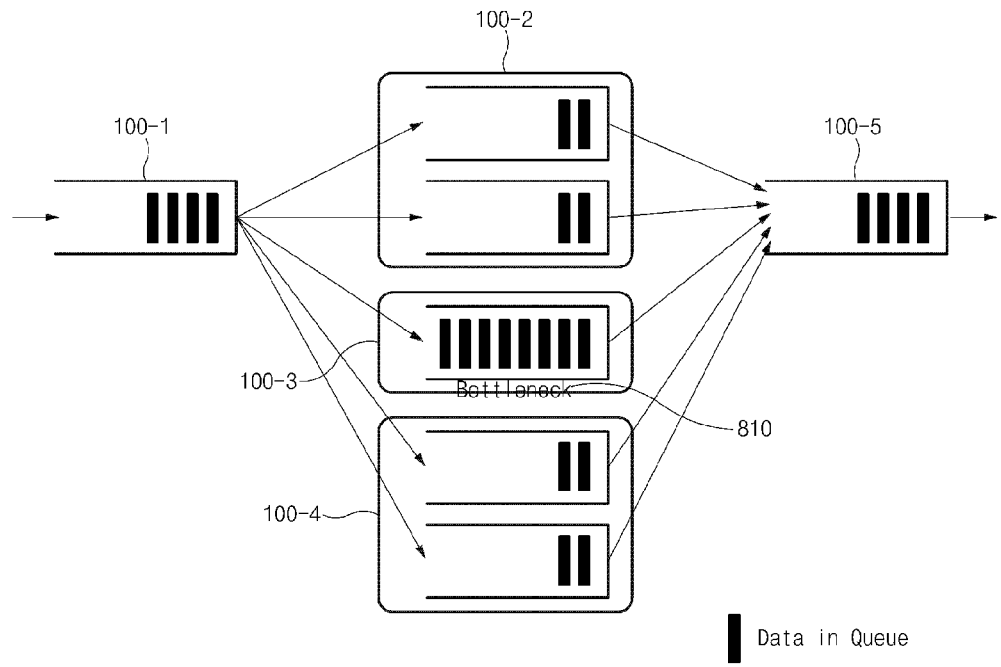
FIG. 8 is a diagram illustrating a bottleneck phenomenon.
Figure 9:
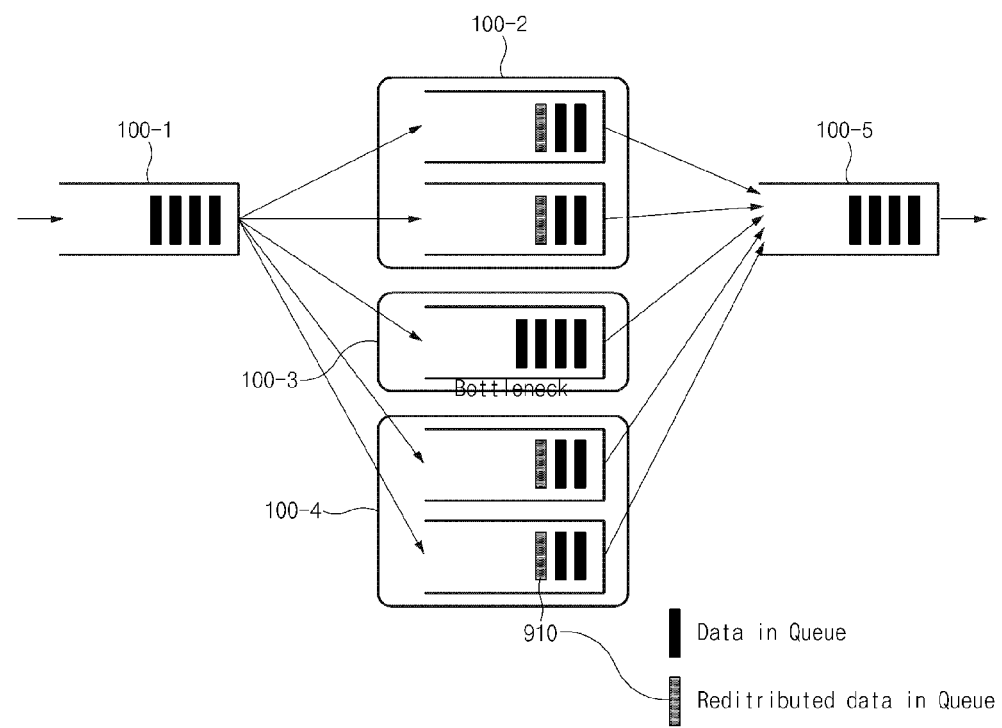
FIG. 9 is a diagram illustrating that data streams stored in a queue of a rate-adaptive DSMS having the bottleneck phenomenon according to an exemplary embodiment of the present invention are distributed to another rate-adaptive DSMS.

As illustrated in FIG. 2, in a state in which the precedence task (alternatively, the rate-adaptive DSMS 100) including the data channel selector 140 is connected with three descendent tasks (alternatively, second to fourth rate-adaptive DSMSs) through the plurality of data channels, and the plurality of feedback channels, when a bottleneck phenomenon for data (alternatively, data stream) 810 stored in a queue of a third rate-adaptive DSMS 100-3 occurs as illustrated in FIG. 8, the data channel selector 150 included in a precedence task 100-1 distributes data 910, which is to be transmitted to the third rate-adaptive DSMS 100-3, to a second rate-adaptive DSMS 100-2 and a fourth rate-adaptive DSMS 100-4, based on the analysis result analyzed by the feedback analyzer 140 included in the precedence task 100-1, as illustrated in FIG. 9. In this case, the feedback analyzer 140 included in the precedence task 100-1 generates the analysis result based on the control command which is feedback information transmitted from the third rate-adaptive DSMS 100-3 which is the descendent task.

Figure 10:
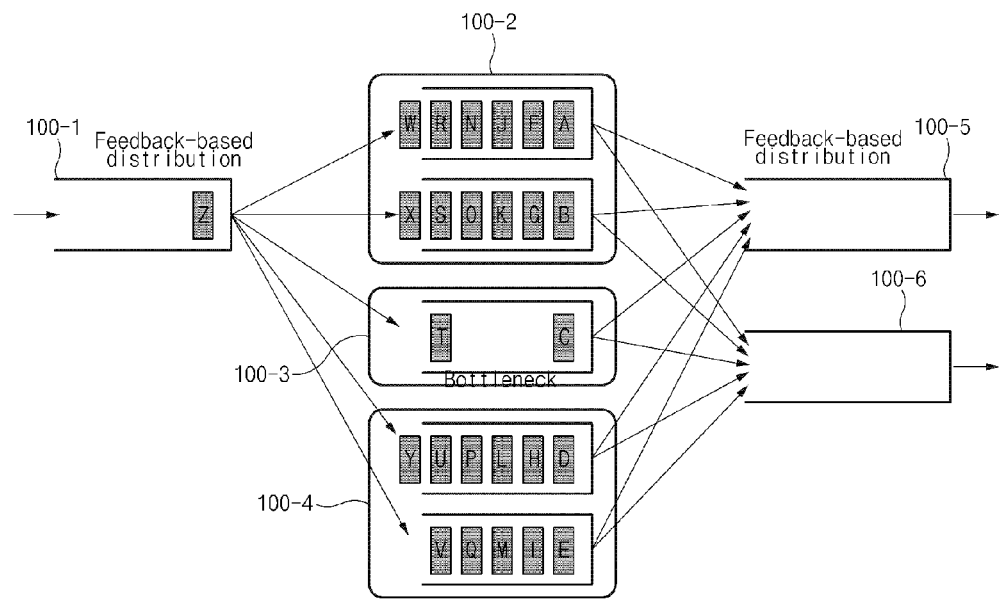
FIG. 10 is an initial exemplary diagram in feedback based distribution between one or more tasks with a ¼ delay and one or more tasks without a ¼ delay according to an exemplary embodiment of the present invention.

FIG. 10 is an initial exemplary diagram in feedback based distribution between one or more tasks with a ¼ delay and one or more tasks without a ¼ delay. That is, as illustrated in FIG. 10, the precedence task (alternatively, the first rate-adaptive DSMS 100-1) including the data channel selector 150 previously recognizes the ¼ delay in some descendent tasks based on the control commands transmitted from the descendent tasks (for example, the second to fourth rate-adaptive DSMSs 100-2, 100-3, and 100-4), transmits to the descendent task (for example, the third rate-adaptive DSMS 100-3) with the ¼ delay data once during four-time transmissions, and transmits to the descendent task (for example, the second rate-adaptive DSMS 100-2 and the fourth rate-adaptive DSMS 100-4) without the ¼ delay data every time during four-time transmissions.

Figure 11:
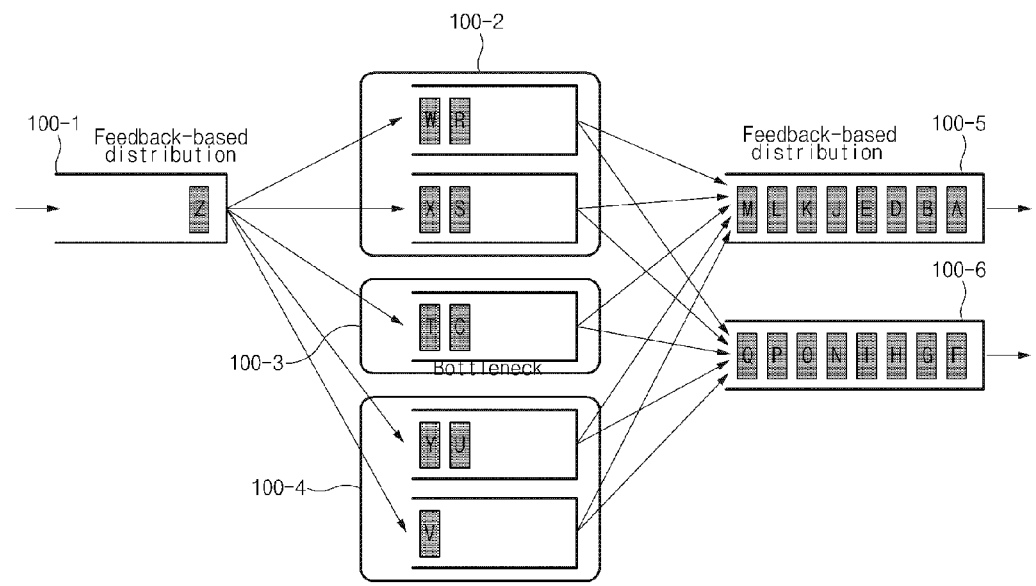
FIG. 11 is an exemplary diagram illustrating a state after the distribution in FIG. 10 according to the exemplary embodiment of the present invention.

FIG. 11 is an exemplary diagram illustrating a state after the distribution of FIG. 10 is performed. That is, as illustrated in FIG. 11, in a feedback based distribution, A, B, D, and E are received by a fifth DSMS 100-5, F, G, H, and I are received by a sixth DSMS 100-6, and thereafter, J, K, L, and M are received by the fifth DSMS 100-5 and N, O, P, and Q are received by the sixth DSMS 100-6.

Figure 12:
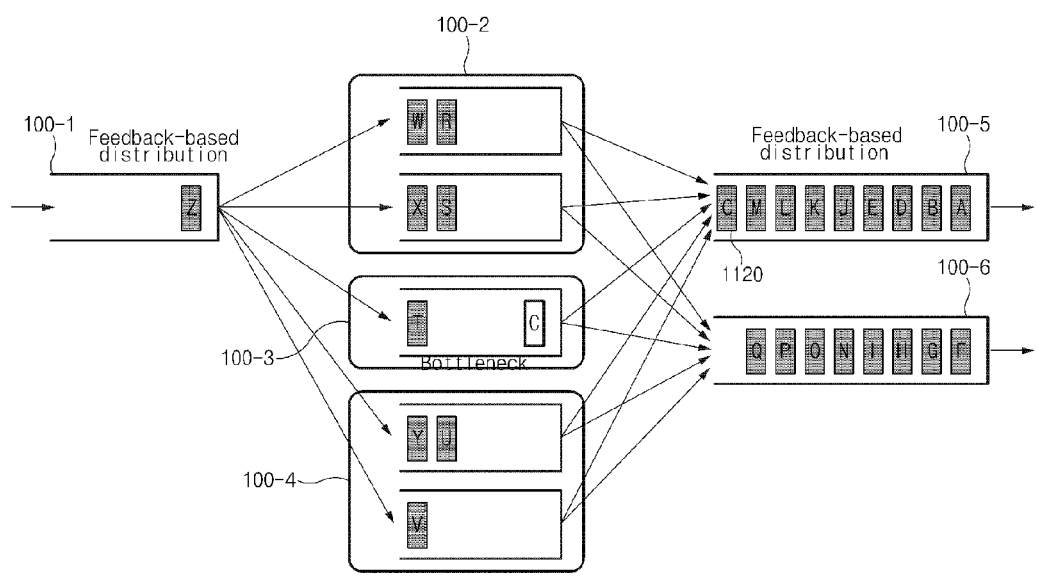
FIG. 12 is an exemplary diagram illustrating a transmission state of the data streams after

FIG. 12 is an exemplary diagram illustrating a state in which data 1210 called C is transmitted to the fifth DSMS 100-5 after FIG. 11 is performed. As described above, in order to apply the feedback based distribution, the rate-adaptive DSMS 100 needs to be configured to have communication channels of a plurality of paths.

The data processing unit 160 receives the data stream transferred from the data receiver 110. The data processing unit 160 performs a predetermined processing function for the data stream. For example, in the case of a stream word count, the data processing unit 160 performs a function to separate the data stream into words and count the number of the respective words. The data processing unit 160 transfers a processing result, that is, the corresponding data stream to the data channel selector 150.

As described above, a plurality of path channels is formed in order to process large-capacity data and a rate may be applied to a communication amount.

As described above, the data is not distributively parallelized to the simple communication channels of the plurality of paths, but a network communication flow to the plurality of channels may be adaptively controlled based on feedback information corresponding to a processing rate for each channel depending on the communication amount of the communication channels of the plurality of paths.

Hereinafter, a control method of a rate-adaptive data stream management system according to the present invention will be described in detail with reference to FIGS. 1 to 15.

Figure 13:
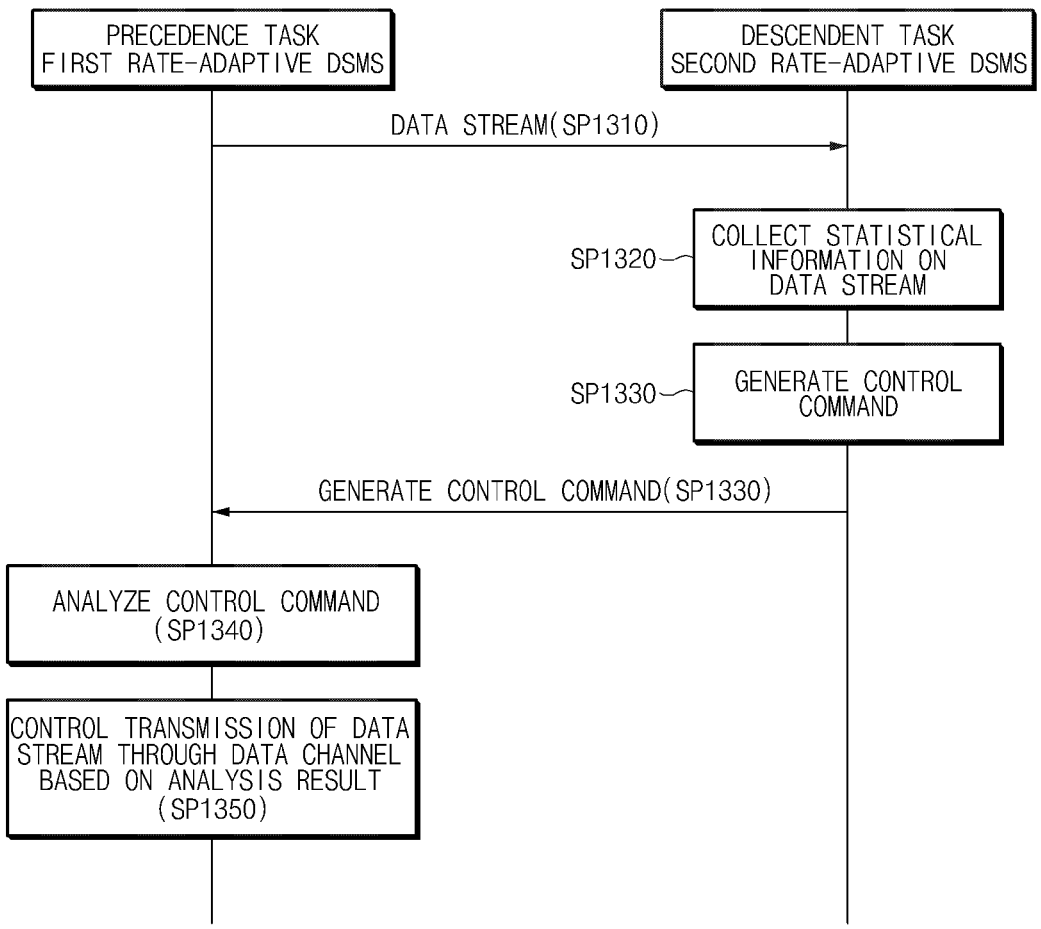
FIG. 13 is a signal flowchart for describing a communication process of a rate-adaptive data stream management system according to a first exemplary embodiment of the present invention.

FIG. 13 is a signal flowchart for describing a communication process of a rate-adaptive data stream management system according to a first exemplary embodiment of the present invention.

First, a second rate-adaptive DSMS which is a descendent task receives data stream (or data/big data) transmitted from a first rate-adaptive DSMS, which is a precedence task, through a data channel (SP1310).

Thereafter, the second rate-adaptive DSMS collects statistical information on the received data stream. Here, the data stream may be vehicle operating situation information through a black box and the like, driving information and traffic situation information through a navigation, a heart rate and blood pressure information of a driver though a wearable device (alternatively, a smart watch), and the like. Further, the statistical information includes information for understanding a transmission pattern of the precedence task including a data receiving amount for the received data stream, a receiving ratio for the received data stream, and the like (SP1320).

Thereafter, the second rate-adaptive DSMS generates a control command (alternatively, a control command/control signal including state information of the corresponding data channel) including information regarding whether to keep the data channel connected to the first rate-adaptive DSMS, based on the collected statistical information on the data stream. In this case, the second rate-adaptive DSMS may generate the corresponding control command every predetermined cycle or when the existing connection is terminated. Herein, the control command includes information (for example, an ace command) for keeping the corresponding data channel, information (for example, a victim command) for releasing (alternatively, excluding) the corresponding data channel, information (for example, a hidden command) for setting a new data channel, and the like.

The second rate-adaptive DSMS transmits the generated control command to the first rate-adaptive DSMS through a feedback channel.

As an example, the second rate-adaptive DSMS generates a control command including the ace command which is information for continuously keeping the data channel connected with the first rate-adaptive DSMS based on statistical information (for example, a receiving amount of the data for the received data stream, a good/excellent of receiving rate) on the data stream which is collected every predetermined 10 seconds, and transmits the generated control command to the first rate-adaptive DSMS through the feedback channel.

As another example, the second rate-adaptive DSMS generates a control command including the victim command which is information for releasing the data channel connected with the first rate-adaptive DSMS based on statistical information (for example, a receiving amount of the data for the received data stream, a low receiving rate) on the data stream which is collected every predetermined 10 seconds, and transmits the generated control command to the first rate-adaptive DSMS through the feedback channel.

As yet another example, the second rate-adaptive DSMS generates a control command including a hidden command which is information for connection with the first rate-adaptive DSMS through a new data channel based on the collected statistical information on the data stream when the existing connection is terminated, and transmits the generated control command to the first rate-adaptive DSMS through the feedback channel (SP1330).

Thereafter, the first rate-adaptive DSMS receives the control command transmitted from the second rate-adaptive DSMS.

The first rate-adaptive DSMS analyzes the received control command. That is, the first rate-adaptive DSMS analyzes the received control command to verify information (for example, an ace command) for keeping a data channel between the first rate-adaptive DSMS and the second rate-adaptive DSMS included in the corresponding control command, information (for example, a victim command) for releasing the corresponding data channel, information (for example, a hidden command) for setting a new data channel, and the like (SP1340).

Thereafter, the first rate-adaptive DSMS controls transmission of the data stream through the data channel corresponding to the corresponding analyzed result based on the analyzed result (alternatively, the analyzed control command).

As an example, when the information (for example, the ace command) for keeping the data channel between the first rate-adaptive DSMS and the second rate-adaptive DSMS is included in the control command, the first rate-adaptive DSMS transmits a new data stream to the second rate-adaptive DSMS through the corresponding data channel.

As another example, when the information (for example, the victim command) for releasing the data channel between the first rate-adaptive DSMS and the second rate-adaptive DSMS is included in the control command, the first rate-adaptive DSMS releases the data channel connected with the second rate-adaptive DSMS.

As yet another example, when the information (for example, the hidden command) for setting a new data channel between the first rate-adaptive DSMS and the second rate-adaptive DSMS is included in the control command, the first rate-adaptive DSMS sets the new data channel and transmits a new data stream to the second rate-adaptive DSMS through the set new data channel (SP1350).

Figure 14:
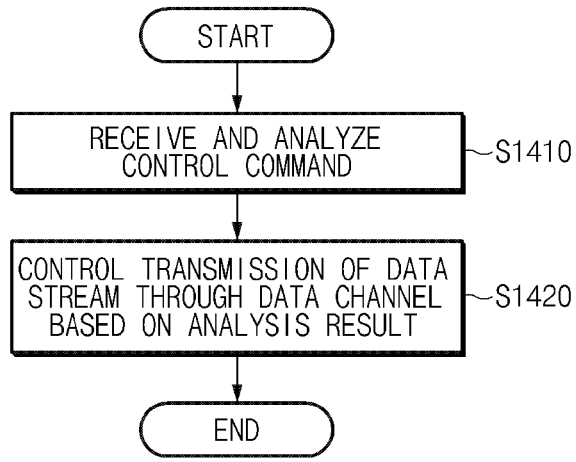
FIG. 14 is a flowchart illustrating a method for controlling a rate-adaptive data stream management system according to a second exemplary embodiment of the present invention.

FIG. 14 is a flowchart illustrating a method for controlling a rate-adaptive data stream management system according to a second exemplary embodiment of the present invention.

First, the feedback analyzer 140 included in the rate-adaptive DSMS 100 which is the precedence task receives the control command transmitted (alternatively, transferred) from the flow controller 130 included in the descendent task. Herein, the control command includes information (for example, an ace command) for keeping the data channel connected between the precedence task and the descendent task, information (for example, a victim command) for releasing (alternatively, excluding) the corresponding data channel, information (for example, a hidden command) for setting a new data channel, and the like. The control command is generated based on the statistical information on the data stream transmitted from the precedence task to the descendent task.

The feedback analyzer 140 included in the precedence task analyzes the received control command. That is, the feedback analyzer 140 included in the precedence task analyzes the received control command to verify the ace command, the victim command, and the hidden command included in the corresponding control command (S1410).

Thereafter, the data channel selector 150 included in the precedence task controls transmission of the data stream through the data channel with the descendent task based on the analysis result.

As one example, when the ace command is included in the analysis result, the data channel selector 150 included in the precedence task continuously transmits the data stream to the descendent task through the current data channel.

As another example, when the victim command is included in the analysis result, the data channel selector 150 included in the precedence task releases the current data channel and attempts (alternatively, sets) connection with a new data channel. Thereafter, the data channel selector 150 included in the precedence task transmits the data stream to the descendent task through the newly set new data channel.

As yet another example, when the hidden command is included in the analysis result, the data channel selector 150 included in the precedence task sets the new data channel and transmits the data stream to the descendent task through the set new data channel (S1420).

Figure 15:
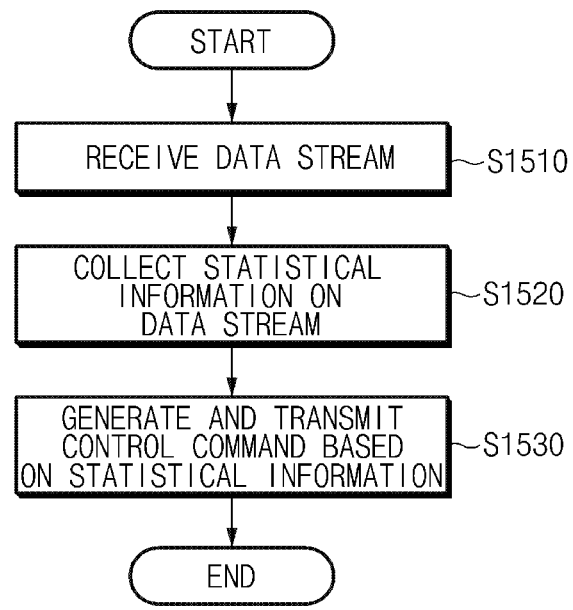
FIG. 15 is a flowchart illustrating a method for controlling a rate-adaptive data stream management system according to a third exemplary embodiment of the present invention.

FIG. 15 is a flowchart illustrating a method for controlling a rate-adaptive data stream management system according to a third exemplary embodiment of the present invention.

First, the data receiver 110 included in the rate-adaptive DSMS 100 which is the descendent task receives the data stream transmitted by the control by the channel selector 150 included in the precedence task. The data receiver 110 included in the descendent task transfers the received data stream to the statistical collector 120 included in the descendent task (S1510).

Thereafter, the statistical collector 120 included in the descendent task collects the statistical information on the data stream received through the data receiver 110 included in the descendent task. Herein, the data stream may be vehicle operating situation information through a black box, and the like, driving information and traffic situation information through a navigation, a heart rate and blood pressure information of a driver though a wearable device (alternatively, a smart watch), and the like. The statistical information includes information for understanding a transmission pattern of the precedence task including a data receiving amount (or throughput) for the received data stream, a receiving ratio for the received data stream, and the like.

The statistical collector 120 included in the descendent task transfers the statistical information on the collected data stream to the flow controller 130 included in the descendent task (SP1520).

Thereafter, the flow controller 130 included in the descendent task generates a control command (alternatively, a control command/control signal) including information regarding the data channel connected with the precedence task is kept based on the statistical information on the data stream. In this case, every predetermined cycle or when the existing connection is terminated, the flow controller 130 included in the descendent task may generate the corresponding control command. Herein, the control command includes information (for example, an ace command) for keeping the data channel connected between the precedence task and the descendent task, information (for example, a victim command) for releasing (alternatively, excluding) the corresponding data channel, information (for example, a hidden command) for setting a new data channel, and the like.

The flow controller 130 included in the descendent task transmits the precedence task and the generated control command to the precedence task through the feedback channel (S1530).

According to the exemplary embodiments of the present invention, as described above, a plurality of path channels is formed in order to process the large-capacity data, and the rate is applied to the communication amount, and as a result, a reduction in the throughput due to a delay of interchannel communication in a plurality of servers, which occurs in the distributive parallelizing technology, is prevented, and a processing rate is updated based on only communication amounts of channels that belong to the task, as compared with the Hadoop system or the open source-based data stream management system which needs to be achieved throughout the task (for example, relocation of the tasks is generally required), and as a result, the granularities are different from each other and data may be processed by the minute unit.

According to the exemplary embodiments of the present invention, as described above, data is distributively parallelized to simple communication channels of a plurality of paths, the network communication flow is adaptively controlled to the plurality of channels based on the feedback information corresponding to the processing rate for each channel depending on the communication amounts of the plurality of path communication channels to provide an efficient data processing rate, as compared with the plurality of simple path communication channels in which data is distributively located by a round robin method or randomly.

Those skilled in the art can modify and change the above description within the scope without departing from an essential characteristic of the present invention. Accordingly, the exemplary embodiments disclosed herein are intended not to limit the technical spirit of the present invention but to describe the technical spirit, and the scope of the technical spirit of the present invention is limited to the exemplary embodiments. The scope of the present invention may be interpreted by the appended claims and all the technical spirit in the equivalent range thereto should be interpreted to be embraced by the claims of the present invention.

What is claimed is:
1. A rate-adaptive data stream management system, comprising:
   a processor; and
   an application unit coupled to the processor, the application unit configured to manage, under control of the processor, applications including:
   a feedback analyzer configured to analyze a control command transmitted from a descendent task to produce an analysis result, the control command including feedback information on received data streams;
   a data channel selector configured to control transmission of a data stream through a data channel with the descendent task; and
   a plurality of lists for managing a plurality of states associated with the data channel, the plurality of lists including a rookie list configured to list at least one newly-acquired data channel,
a discard list configured to list at least one discarded data channel,
a hidden list configured to list at least one newly-reused data channel, and
an ace list configured to list at least one active data channel,
wherein the data channel is transferred to one of the rookie list, the discard list, the hidden list or the ace list based on the analysis result.

2. The rate-adaptive data stream management system of claim 1, the control command including at least one of an ace command, a victim command or a hidden command, wherein:
the ace command is for keeping a data channel;
the victim command is for releasing or excluding a data channel; and
the hidden command is for setting a new data channel.

3. The rate-adaptive data stream management system of claim 2, wherein the data channel selector is configured to transmit the data stream to the descendent task through the data channel in response to the ace command being included in the analysis result.

4. The rate-adaptive data stream management system of claim 2, wherein the data channel selector is configured to release the data channel in response to the victim command being included in the analysis result.

5. The system of claim 2, wherein the data channel selector is configured to set a new data channel and transmit the data stream to the descendent task through the set new data channel in response to the hidden command being included in the analysis result.

6. A rate-adaptive data stream management system, comprising:
a processor; and
an application unit coupled to the processor, the application unit configured to manage, under control of the processor, applications including:
a data receiver configured to receive a data stream transmitted from a precedence task, the precedence task being configured to transmit data streams to a descendent task in accordance with a control command;
a statistical collector configured to collect statistical information on the data stream received through the data receiver; and
a flow controller configured to generate the control command and transmit the generated control command to the precedence task, the control command including information regarding whether to keep the data channel connected with the precedence task based on the statistical information on the data stream;
wherein the flow controller is configured to generate the control command in a predetermined cycle or in response to a connection being terminated, the predetermined cycle including determining a state of a plurality of states associated with the data channel, and the state determining to which list of a plurality of lists the data channel is transferred,
the plurality of lists including
a rookie list configured to list at least one newly-acquired data channel,
a discard list configured to list at least one discarded data channel,
a hidden list configured to list at least one newly-reused data channel, and
an ace list configured to list at least one active data channel.

7. The rate-adaptive data stream management system of claim 6, wherein the statistical information on the data stream includes at least one of a receiving amount or a receiving rate of data for the data stream.

8. The rate-adaptive data stream management system of claim 6, wherein the control command includes any one of:
an ace command including information for keeping the data channel connected between the precedence task and the descendent task,
a victim command including information for releasing the data channel, and
a hidden command including information for setting a new data channel.

9. A method for controlling a rate-adaptive data stream management system (DSMS), comprising using a processor to control an application unit, the application unit including applications configured to implement the rate-adaptive DSMS by performing operations including:
analyzing a control command transmitted from a descendent task to produce an analysis result, the control command including feedback information on received data streams; and
controlling transmission of a data stream through a data channel with the descendent task based on the analysis result;
wherein the controlling of transmission of the data stream through the data channel includes:
determining whether a predetermined cycle has occurred a predetermined number of times;
setting a new data channel and transmitting a data stream to the descendent task through the new data channel if the determining determines that the predetermined cycle has occurred the predetermined number of times; and
transmitting the data stream to the descendent task through the data channel if the determining determines that the predetermined cycle has not occurred the predetermined number of times.

10. A method for controlling a rate-adaptive data stream management system (DSMS), method comprising using a processor to control an application unit, the application unit including applications configured to implement the rate-adaptive DSMS by performing operations including:
receiving a data stream transmitted from a precedence task;
collecting statistical information on the received data stream;
generating a control command including information regarding whether to keep a data channel connected with the precedence task based on the statistical information on the data stream, the precedence task being configured to transmit data streams to a descendent task in accordance with the control command;
transmitting the generated control command to the precedence task;
maintaining a plurality of lists for managing a plurality of states associated with the data channel, the plurality of lists including a rookie list configured to list at least one newly-acquired data channel, a discard list configured to list at least one discarded data channel, a hidden list configured to list at least one newly-reused data channel, and an ace list configured to list at least one active data channel; and transferring the data channel to one of the rookie list, the discard list, the hidden list or the ace list based on the control command.

\* \* \* \* \*